United States Patent Office 3,468,880
Patented Sept. 23, 1969

3,468,880
17-SUBSTITUTED 3-(p-METHOXYBENZENE-SULFONOXY)ANDROST-5-ENES
John Wayne Cole, Deerfield, Ill., and Charles George Lex, Kenosha, Wis., assignors to Abbott Laboratories, North Chicago, Ill., a corporation of Illinois
No Drawing. Filed Sept. 9, 1966, Ser. No. 578,129
Int. Cl. C07c *169/08, 173/00;* A61k *17/00*
U.S. Cl. 260—239.55         5 Claims

ABSTRACT OF THE DISCLOSURE 17-substituted 3-(p-methoxybenzenesulfonoxy)androst-5-enes show anti-androgenic activity in warm-blooded animals when orally administered at low dosages.

Disclosure

The present invention is directed to androst-5-enes carrying in the 3-position a p-methoxybenzenesulfonoxy group and certain substituents in the 17α- and 17β-positions. More particularly the invention is directed to compounds of the formula:

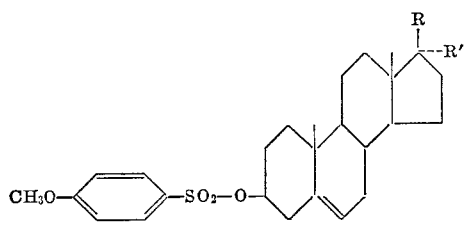

wherein R is hydroxy or an acid-labile radical and R' is hydrogen, a loweralkyl of 1 to 4 carbon atoms or ethynyl, or R and R' together may be oxygen. The term "acid-labile radical" expresses that the radical so designated cleaves off in an acid environment to be replaced with hydroxy; typical examples of such an acid-labile radical are 1-ethoxycyclopentoxy, tetrahydropyranoxy, cyclopenten-1-oxy and others as described by Ercoli et al. in Chem. and Industry, page 1284 of 1962.

The new compounds wherein R and R' are individual radicals produce anti-androgenic activity in warm-blooded animals and particularly inhibit prostate growth when administered orally at doses of between 5 and 50 mg./kg. per day to male, warm-blooded animals. Other uses of anti-androgens are described by Dorfman in Acta Endocrinologica, vol. 33, page 308 of 1960.

Although many esters known of the 3-hydroxyandrost-5-enes, e.g. 3β-acetoxyandrost-5-enes, possess hormonal activity like the parent androgen, the new 3β-(p-methoxybenzenesulfonoxy)androst-5-enes of the present invention show a reversal of that action or a blocking action relative to the parent androstene compound.

The new compound wherein R and R' together are oxygen is a valuable intermediate useful in the preparation of the compounds wherein R and R' have the above individual meaning.

The new compounds may be made by treating an androst-5-ene-3β-ol carrying at the 17-position any of the above described functions with p-methoxybenzenesulfonyl chloride at a temperature of between 10° and 35° C. for a period of 2-24 hours in the presence of a tertiary amine solvent, e.g. pyridine, triethylamine, or picoline, diluting the reaction mixture with water and isolating the new ester from the aqueous mixture. When the starting material in this reaction carries a 17-oxo group, the obtained 3β-(p-methoxybenzenesulfonoxy)-androst-5-ene-17-one can be converted to the compounds carrying the other functions listed above at the 17-position by known reactions; for instance, the oxo-group can be reduced to a hydroxy group by treatment with sodium borohydride and other known procedures may be used to introduce the other above-named functions at the 17-position.

To better understand the process leading to the compounds of the present invention, reference is made to the following examples which are given as illustration only and which are not meant to limit the invention in any respect except as indicated in the claims.

Example 1.—3β-(p-methoxybenzenesulfonoxy)
androst-5-en-17β-ol

A mixture of 10 g. of 3β-hydroxyandrost-5-en-17-one, 11 g. of p-methoxybenzenesulfonyl chloride and 30 ml. of pyridine is stirred at room temperature for 3 minutes and then allowed to stand for 18 hours before water is added in small portions to cause the remaining acid chloride to hydrolyze. The separating oil is dissolved in methylene chloride and this solution is washed four times with water. The methylene chloride solution is then evaporated and the residue is crystallized from 80% aqueous acetone to produce 13 g. of 3β-(p-methoxy-benzenesulfonoxy)androst-5-en-17-one melting at 139° C.

A suspension of 3.6 g. of this compound in 160 ml. of methanol is mixed with a clear solution of 2.0 g. of sodium borohydride in 8 ml. of water and stirred for 20 minutes at 20° C. The mixture becomes clear before crystallization occurs. A solution of 2 ml. of acetic acid in 50 ml. of water is added dropwise to improve crystallization. The crystals are separated, washed with 50% aqueous methanol and dried to obtain 2.7 g. of 3β-(p-methoxybenzenesulfonoxy)androst - 5 - en - 17β-ol melting at 113–115° which analyzes correctly for the compound with the assigned structure and having the empirical formula $C_{26}H_{36}O_5S$. From the filtrate, a second crop of 0.5 g. of the described compound is obtained.

Example 2.—3β-(p-methoxybenzenesulfonoxy)-17α-
ethynylandrost-5-en-17β-ol

A mixture of 1.0 g. of 17α-ethynylandrost-5-en-3β,17β-diol, 1.38 g. of p-methoxybenzenesulfonyl chloride and 5 ml. of pyridine is allowed to stand at room temperature for 16 hours. Water is then added dropwise until 50 ml. are used. The product is extracted with ether and the ether solution is washed, in series, with water, 2 N-hydrochloric acid, water, dilute aqueous sodium bicarbonate, and water. After drying over magnesium sulfate, the ether is evaporated producing crystals of 3β-(p-methoxybenzenesulfonoxy)-17α-ethynylandrost - 5-en-17β-ol, which after recrystallization from ether melts with decomposition at 138–141° and analyzes correctly for the desired compound of empirical formula $C_{28}H_{36}O_5S$.

Example 3.—3β-(p-methoxybenzenesulfonoxy)-17α-
methylandrost-5-en-17β-ol

By repeating the process described in Example 2 but using as the steriodal starting material 1.0 g. of 17α-methylandrost-5-en-3β,17β-diol, one obtains 3β-(p-methoxy-benzenesulfonoxy)-17α-methylandrost - 5 - en-17β-ol as white crystals melting with decomposition at 128.5–130° C.; they analyze correctly for $C_{27}H_{38}O_5S$.

Similarly, when 17α-n-butylandrost-5-en-3β,17β-diol is used as the starting material, 3β-(p-methoxybenzenesulfonoxy)-17α-butylandrost-5-en-17β-ol of empirical formula $C_{30}H_{44}O_5S$, is obtained.

Example 4.—3β-(p-methoxybenzenesulfonoxy)-17β-(tetrahydropyran-2-oxy)androst-5-ene By the procedure of Example 2 but using as starting material 17β-(tetrahydropyran-2-oxy)androst-5-en-3β-ol described by Ruggieri in Annali di Chimica (Rome), vol. 48, page 1048 of 1958, one obtains the corresponding p-methoxybenzenesulfonic acid ester as an amorphous product. This product is purified by placing it on a column of silica gel using pentane/ether 3:2 as the eluting solvent. The crystalline fraction obtained in the eluate is recrystallized from ether to obtain pure 3β-(p-methoxybenzenesulfonoxy)-17β - (tetrahydropyran-2-oxy)androst-5-ene as white plates, which melt at 116–120° C. with subsequent decomposition at 142–147° C. The compound analyzes correctly for the desired product of empirical formula $C_{31}H_{44}O_6S$.

Similarly, 17β - (cyclopenten-1-oxy)androst-5-en-3β-ol is esterified according to Example 2 to yield 3β-(p-methoxybenzenesulfonoxy)-17β - cyclopenten-1-oxyandrost-5-ene, and 3β-(p - methoxybenzenesulfonoxy)-17β-(1-ethoxycyclopentoxy)androst-5-ene is obtained by the process of Example 2 but using 17β-(1-ethoxycyclopentoxy)-androst-5-en-3β-ol as the starting material. The starting materials just mentioned can be prepared in analogy to the process described by Ercoli et al. referred to above.

The physiologically active compounds of the present invention have, in view of their parent 3-hydroxy analogs, a very surprising and unusual activity in that they are useful prostate growth inhibitors and anti-androgens while the parent compounds are androgens. As such the new compounds can be administered alone or together with other physiologically active compounds in combination with the usual pharmaceutical carriers. One advantage of the new compounds over known anti-androgens is that they are active by oral administration while other compounds having similar physiological effects often require injection.

We claim:
1. A steroid of the formula:

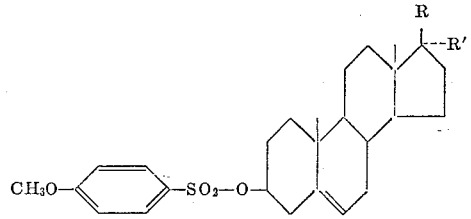

wherein R is hydroxy or an acid-labile radical and R' is hydrogen, loweralkyl or ethynyl.

2. The compound of claim 1 wherein R is hydroxy and R' is a loweralkyl of 1 to 4 carbon atoms.

3. A compound of claim 1 wherein R is 2-tetrahydropyranoxy.

4. 3β-(p - methoxybenzenesulfonoxy)androst - 5 - en-17β-ol.

5. 3β - (p - methoxybenzenesulfonoxy)-17α - ethynylandrost-5-en-17β-ol.

References Cited

UNITED STATES PATENTS 3,109,850  11/1963  Wettstein et al. ____ 260—397.5

OTHER REFERENCES

Butenandt et al.: Chemische Berichte, 69, 1936, p. 2776–2778.

LEWIS GOTTS, Primary Examiner

E. C. LOVE, Assistant Examiner

U.S. Cl. X.R.

260—397.4, 397.5, 999